Patented Oct. 13, 1925.

1,557,485

UNITED STATES PATENT OFFICE.

ALFRED S. TURNER, OF BLADEN, NEBRASKA.

PROCESS OF MAKING GLASS CLOTH AND ARTICLE MANUFACTURED THEREBY.

No Drawing.   Application filed September 5, 1924.   Serial No. 736,189.

*To all whom it may concern:*

Be it known that I, ALFRED S. TURNER, a citizen of the United States and resident of Bladen, in the county of Webster and State of Nebraska, have invented a certain new and useful Process of Making Glass Cloth and Article Manufactured Thereby, of which the following is a specification.

The present invention relates to a novel process of making fabrics transparent, durable, water- and weather-proof, and in producing by this process an article of commerce, a substitute for glass, the so-called glass-cloth.

It is the principal object of my invention to enable the making by hand of an excellent fabric of compact web, which is durable, transparent, water- and weather-proof, from a comparatively inexpensive material by a very simple mechanical process or method, thus saving expense and labor, while producing an extremely useful article.

Another object of the invention is the provision of a novel process of making fabrics, particularly cotton fabrics more durable and transparent and rendering same water- and weather-proof so as to make it extremely practical for use as a substitute for the heretofore used glass in hot-beds, greenhouses, cold-frames, poultry-houses and equipment.

A further object of the invention is the provision of a novel process and article of commerce made by the same adapted to exclude outdoor temperature and to generate, collect and retain warmth and light, and thus to stimulate the growth of plants by shutting out cold, snow, wind and rain, while being transparent to admit light, shedding a warm, soft, white light which is preferred by poultry for instance to undiffused sun rays.

It will be apparent that the fabric treated and made according to the present invention will effectively replace the glass heretofore used for the above mentioned purposes and will effectively overcome the disadvantages inherent in the use of glass, as it is much cheaper to manufacture, will last longer than the easily breaking glass, and can quickly and conveniently be repaired.

Furthermore, it will allow construction by unskilled labor with the use of such tools as are found in every household, while it can safely be handled during shipment, and will shed a warm soft light not requiring the white washing of for instance greenhouse panes in order to protect the growing plants against the withering rays of glaring sunlight.

These and other objects and advantages of my invention will become more fully known as the description thereof proceeds, and will then be specifically pointed out in the appended claims.

In order to accomplish the above results, and to make fabrics, particularly cotton fabrics more durable as usual and transparent as well as water- and weather-proof, I use a good grade of muslin as it comes from the bleacheries, and size it with a sodium silicate such as water-glass in solution or similar suitable sizing material in order to make the fabric durable and to withstand the deteriorating influence of the elements and to prevent rotting of the fabric. The material is then passed through a drier of any well known, suitable type or construction, and is then passed though a solution which is composed of a petroleum distillate such as molten paraffine wax and carnauba wax. The paraffine will give the fabric a coating of weather resisting quality and the carnauba wax will raise the melting point of the paraffine so that it will withstand warm weather without softening and running off the fabric.

Hereafter the fabric treated in the aforedescribed manner is calendared or run through a smoother of well known suitable type and cooled in any desirable manner, whereupon it is wound in rolls and ready for shipment.

It will be clear that the glass-cloth manufactured by the above method has many useful qualities and that such changes may be made in the execution of my process as fall within the scope of the appended claims without departing from the spirit of my invention.

Having thus described my invention, what I claim as new, and desire to protect by Letters Patent is:

1. The process of making fabrics durable, transparent, water- and weather-proof, which consists in sizing the fabric with a sodium silicate, drying the same, coating it with a fusible weather-resisting petroleum distillate, adding carnauba wax for raising the melting point of said material, and finally smoothening and cooling the material.

2. The process of making a substitute for glass, so-called glass-cloth consisting in sizing muslin with a sodium silicate, drying the same, coating it with a fusible weather-resisting petroleum distillate, adding carnauba wax for raising the melting point of said material, and finally calendering and cooling the fabric.

3. The process of making glass-cloth consisting in sizing bleached muslin of a good grade with a water-glass solution, drying the material, coating it with a solution of molten paraffine and carnauba wax, and finally calendering and cooling the cloth.

4. As an article of manufacture a glass-cloth comprising a bleached muslin base and a coating of paraffine and carnauba wax.

5. As an article of manufacture a glass-cloth comprising a bleached muslin base sized with a sodium silicate, and a coating of paraffine and carnauba wax.

Signed at Bladen in the county of Webster and State of Nebraska this 27th day of August A. D. 1924.

ALFRED S. TURNER.